US011487281B2

(12) United States Patent
Lavoie et al.

(10) Patent No.: US 11,487,281 B2
(45) Date of Patent: Nov. 1, 2022

(54) SYSTEMS AND METHODS FOR EXECUTING REMOTELY-CONTROLLED AUTOMATED VEHICLE PARKING OPERATIONS

(71) Applicant: Ford Global Technologies, LLC, Dearborn, MI (US)

(72) Inventors: Erick Michael Lavoie, Van Buren Charter Township, MI (US); Lawrence Chikeziri Amadi, Chicago, IL (US); Hemanth Yadav Aradhyula, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 16/809,101

(22) Filed: Mar. 4, 2020

(65) Prior Publication Data
US 2021/0278835 A1 Sep. 9, 2021

(51) Int. Cl.
*G05D 1/00* (2006.01)
*B60W 30/06* (2006.01)
(Continued)

(52) U.S. Cl.
CPC .......... *G05D 1/0038* (2013.01); *B60W 30/06* (2013.01); *G05D 1/0016* (2013.01);
(Continued)

(58) Field of Classification Search
CPC ............... G05D 1/0038; G05D 1/0016; G05D 2201/0213; G05D 1/0011; G05D 1/0055;
(Continued)

(56) References Cited

U.S. PATENT DOCUMENTS 9,970,615 B1 5/2018 Cardillo et al.
2016/0231741 A1* 8/2016 Felteau ................ H04B 1/3833
(Continued)

OTHER PUBLICATIONS

"Light is expanding from smartphone cameras to self-driving cars," Brian Heater; Web page <https://www.techcrunch.com/2019/02/26/light-is-expanding-from-smartphone-cameras-to-self-driving-cars/.html>, 10 pages, retrieved from the Internet on Dec. 4, 2020.

*Primary Examiner* — Muhammad Shafi
(74) *Attorney, Agent, or Firm* — Frank Lollo; Eversheds Sutherland (US) LLP

(57) ABSTRACT

The disclosure is generally directed to remotely-controlled automated vehicle parking operations. A driver of a vehicle stands on a curb and launches a software application on a handheld device. The software application uses a camera of the handheld device to capture images of the vehicle that can be observed by the driver. The software application then attempts to obtain a visual lock between the camera and the vehicle. In some cases, obtaining the visual lock may be hampered due to adverse lighting conditions. Light may be transmitted from the handheld device to illuminate the vehicle for better image capture. Alternatively, a command can be transmitted from the handheld device to a controller in the vehicle for turning on a light in the vehicle. After obtaining visual lock, various techniques such as vehicle path prediction and interpolation, can be used for effectively tracking the vehicle.

17 Claims, 7 Drawing Sheets

(51) Int. Cl.
*G06V 10/141* (2022.01)
*G06V 20/20* (2022.01)

(52) U.S. Cl.
CPC ............ *G06V 10/141* (2022.01); *G06V 20/20* (2022.01); *B60W 2555/20* (2020.02); *G06V 2201/08* (2022.01)

(58) Field of Classification Search
CPC ............ B60W 30/06; B60W 2555/20; G06V 10/141; G06V 20/20; G06V 2201/08; G06V 10/60; G06V 20/56; B60K 2370/55; B60K 2370/566; B60K 2370/573
USPC ............................................................ 701/2
See application file for complete search history.

(56) References Cited

U.S. PATENT DOCUMENTS

| | | | |
|---|---|---|---|
| 2016/0284217 A1 | 9/2016 | Lee et al. | |
| 2017/0285629 A1* | 10/2017 | Christen | G05D 1/0016 |
| 2017/0368983 A1* | 12/2017 | Salter | F21V 19/003 |
| 2019/0084585 A1* | 3/2019 | Fritz | B60Q 1/346 |
| 2020/0053563 A1* | 2/2020 | Birchenko | H04W 12/06 |

\* cited by examiner

SYSTEMS AND METHODS FOR EXECUTING REMOTELY-CONTROLLED AUTOMATED VEHICLE PARKING OPERATIONS

FIELD OF THE DISCLOSURE

This disclosure generally relates to vehicles, and more particularly relates to systems and methods for executing remotely-controlled automated vehicle parking operations.

BACKGROUND

A parking operation performed by a vehicle that is partially autonomous may necessitate certain actions to be carried out by an individual who is standing on a curb and monitoring the movements of the vehicle via a handheld device. For example, an automated parking operation may involve the individual carrying out a vehicle-identification action on the handheld device to ensure that the vehicle executing the parking operation is his/her vehicle. Upon completion of the vehicle-identification action, the handheld device may attempt to achieve a visual lock on the vehicle in order to allow the person to track the movement of the vehicle. However, obtaining a visual lock can be challenging under certain adverse ambient conditions, such as, for example, poor lighting (darkness, bright sunlight in the background) and poor visibility (rain, smog, haze etc.).

It is therefore desirable to provide solutions that address at least some of the challenges associated with using a handheld device for monitoring automated parking maneuvers carried out by a vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
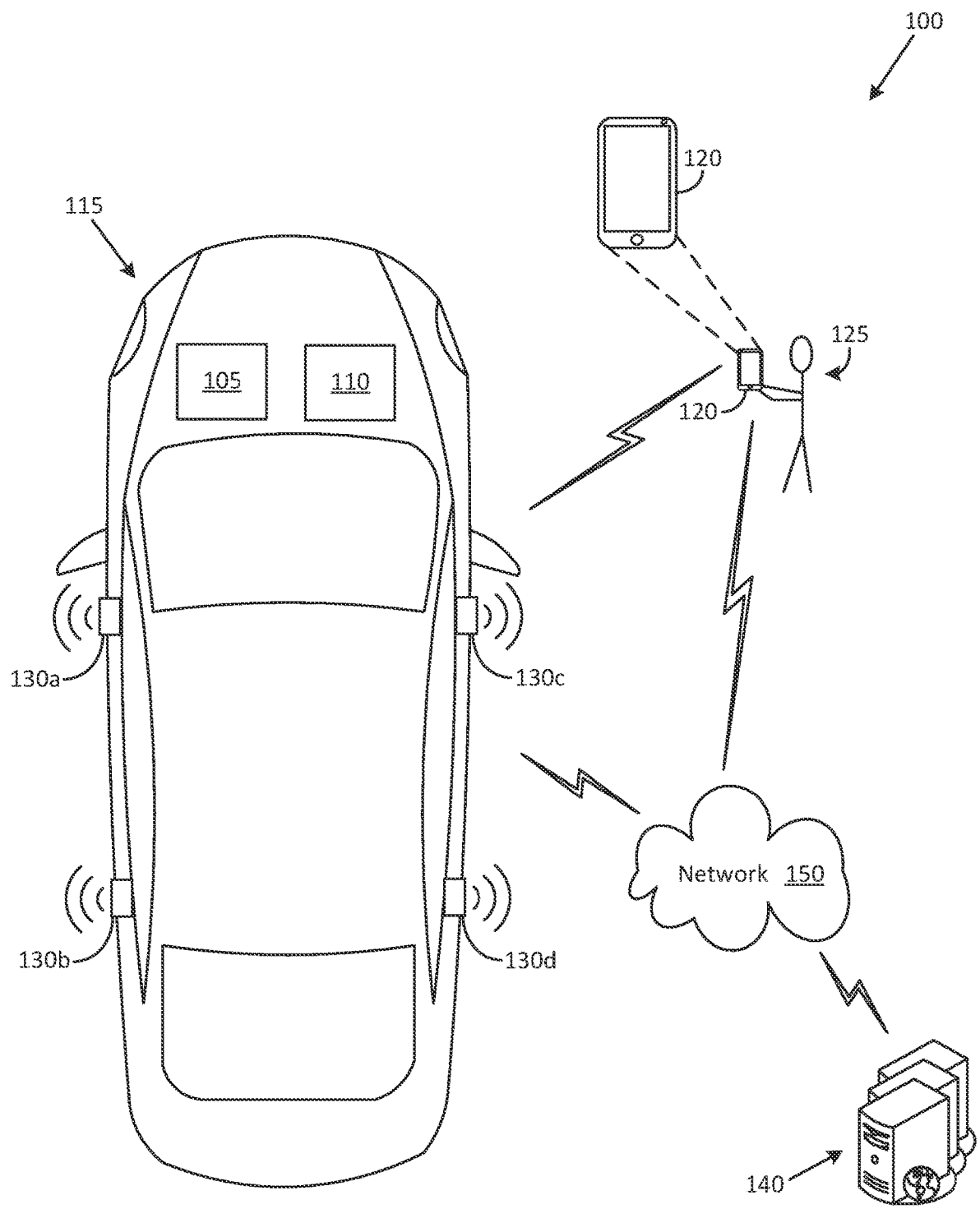
FIG. 1 illustrates an example remotely-controlled automated vehicle parking system in accordance with the disclosure.

In terms of a general overview, this disclosure is directed to systems and methods for executing a remotely-controlled automated vehicle parking operation. In one example scenario, a driver of a vehicle may stand on a curb and perform certain operations upon a handheld device in order to execute a remotely-controlled parking operation of his/her vehicle. As a part of this procedure, the driver may launch an application in the handheld device that uses a camera of the handheld device to capture an image of the vehicle. The image can be a part of a video clip that is used by the driver to monitor the movement of the vehicle when the vehicle is carrying out an automated parking operation. The driver may first confirm an identity of his/her vehicle by performing an action such as dragging and dropping an icon upon the vehicle. The application then attempts to obtain a visual lock between the camera of the handheld device and the vehicle. In some cases, obtaining the visual lock may turn out to be difficult or infeasible due to various adverse conditions such as low ambient light, low visibility, snow accumulation of the vehicle, and/or high background illumination. Consequently, in one example embodiment, light is transmitted from the handheld device (from a flash lighting system, for example) to illuminate the vehicle for better image capture. In another example embodiment, a command is transmitted from the handheld device to the vehicle instructing a controller in the vehicle to turn on one or more vehicle lights. The light is then used for capturing images of the vehicle. After obtaining visual lock, the handheld device is used for tracking a movement of the vehicle. Various techniques such as vehicle path prediction and interpolation can be used for effectively tracking the movement of the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. It should also be understood that the word "example" as used herein is intended to be non-exclusionary and non-limiting in nature.

Furthermore, certain words and phrases that are used herein should be interpreted as referring to various objects and actions that are generally understood in various forms and equivalencies by persons of ordinary skill in the art. For example, the phrase "remotely-controlled automated vehicle parking operation" as used herein is not limited to a person controlling or modifying the movements of a vehicle when the vehicle is executing an automated/autonomous parking operation, but also encompasses monitoring actions performed by the person. When monitoring, the person may refrain from controlling or modifying the movement of the vehicle. The phrase "automated vehicle parking" as used herein is generally equivalent to the phrase "self-parking." The word "automated" as used herein is generally equivalent to the word "autonomous." It must be understood that either word generally pertains to a vehicle that can execute certain operations without involvement of a human driver. The word "vehicle" as used in this disclosure can pertain to any one of various types of vehicles such as cars, vans, sports utility vehicles, trucks, electric vehicles, gasoline vehicles, hybrid vehicles, and autonomous vehicles. The phrase "automated vehicle" or "autonomous vehicle" as used in this disclosure generally refers to a vehicle that can perform at least a few operations without human intervention. At least some of the described embodiments are applicable to Level 2 vehicles, and may be applicable to higher level vehicles as well. The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation. The phrase "software application" as used herein with respect to a handheld device such as a smartphone, refers to various types of code (firmware, software, machine code etc.) that is installed in the handheld device and executed by the use of a human machine interface (HMI). The term HMI as used herein encompasses a graphical user interface (GUI) as well as various other interfaces.

FIG. 1 illustrates an example remotely-controlled automated vehicle parking system 100 in accordance with the disclosure. The vehicle 115 may be one of various types of vehicles such as a gasoline powered vehicle, an electric vehicle, a hybrid electric vehicle, or an autonomous vehicle that is configured as a Level 2 (or higher) automated vehicle. The remotely-controlled automated vehicle parking system 100 may be implemented in a variety of ways and can include various type of devices. For example, the remotely-controlled automated vehicle parking system 100 can include some components that are a part of the vehicle 115, some that may be carried by an individual 125, and others that may be accessible via a communications network 150. The components that can be a part of the vehicle 115 can include a vehicle computer 105, an auxiliary operations computer 110, and a wireless communication system. Components that may be carried by the individual 125 can include a handheld device 120 that includes a processor, a camera, and a display screen. Some examples of the handheld device 120 include a smartphone, a tablet computer, and a phablet (phone plus tablet or an iPod Touch®). Components that may be accessible by the vehicle computer 105, the auxiliary operations computer 110, and/or the handheld device 120, via the communications network 150 can include a server computer 140.

The vehicle computer 105 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The auxiliary operations computer 110 may be used to support remotely-controlled automated vehicle parking operations in accordance with the disclosure. In some cases, some, or all, of the components of the auxiliary operations computer 110 may be integrated into the vehicle computer 105.

The wireless communication system can include a set of wireless communication nodes 130a, 130b, 130c, and 130d mounted upon the vehicle 115 in a manner that allows the auxiliary operations computer 110 and/or the vehicle computer 105 to communicate with devices such as the handheld device 120 carried by the individual 125. In an alternative implementation, a single wireless communication node may be mounted upon the roof of the vehicle 115. The wireless communication system may use one or more of various wireless technologies such as Bluetooth®, Ultra-Wideband (UWB), Wi-Fi, Zigbee®, Li-Fi (light-based communication), audible communication, ultrasonic communication, or near-field-communications (NFC), for carrying out wireless communications with devices such as the handheld device 120.

The auxiliary operations computer 110 and/or the vehicle computer 105 can utilize the wireless communication system to communicate with the server computer 140 via the communications network 150. The communications network 150 may include any one network, or a combination of networks, such as a local area network (LAN), a wide area network (WAN), a telephone network, a cellular network, a cable network, a wireless network, and/or private/public networks such as the Internet. For example, the communications network 150 may support communication technologies such as Bluetooth®, Ultra-Wideband, cellular, near-field communication (NFC), Wi-Fi, Wi-Fi direct, Li-Fi, machine-to-machine communication, and/or man-to-machine communication. At least one portion of the communications network 150 includes a wireless communication link that allows the server computer 140 to communicate with one or more of the wireless communication nodes 130a, 130b, 130c, and 130d on the vehicle 115. The server computer 140 may communicate with the auxiliary operations computer 110 and/or the vehicle computer 105 for various purposes such as for authenticating the handheld device 120.

The handheld device 120 may communicate with the vehicle computer 105 via one or more of the first set of wireless communication nodes 130a, 130b, 130c, and 130d so as to allow the individual 125 (a driver, for example) to remotely control an automated vehicle parking operation executed by the vehicle 115. For example, in one scenario in accordance with the disclosure, the individual 125, who may be driving the vehicle 115, gets out of the vehicle 115 and uses the handheld device 120 to remotely initiate an autonomous parking procedure of the vehicle 115. During the autonomous parking procedure, the vehicle 115 moves autonomously to park itself at a parking spot located near the individual 125. In one case, the vehicle 115 can be a L2 level vehicle that performs a parking maneuver without human assistance. The individual 125 monitors the movement of the vehicle 115 during the parking maneuver so as to minimize the chances of an accident taking place.

Figure 2:
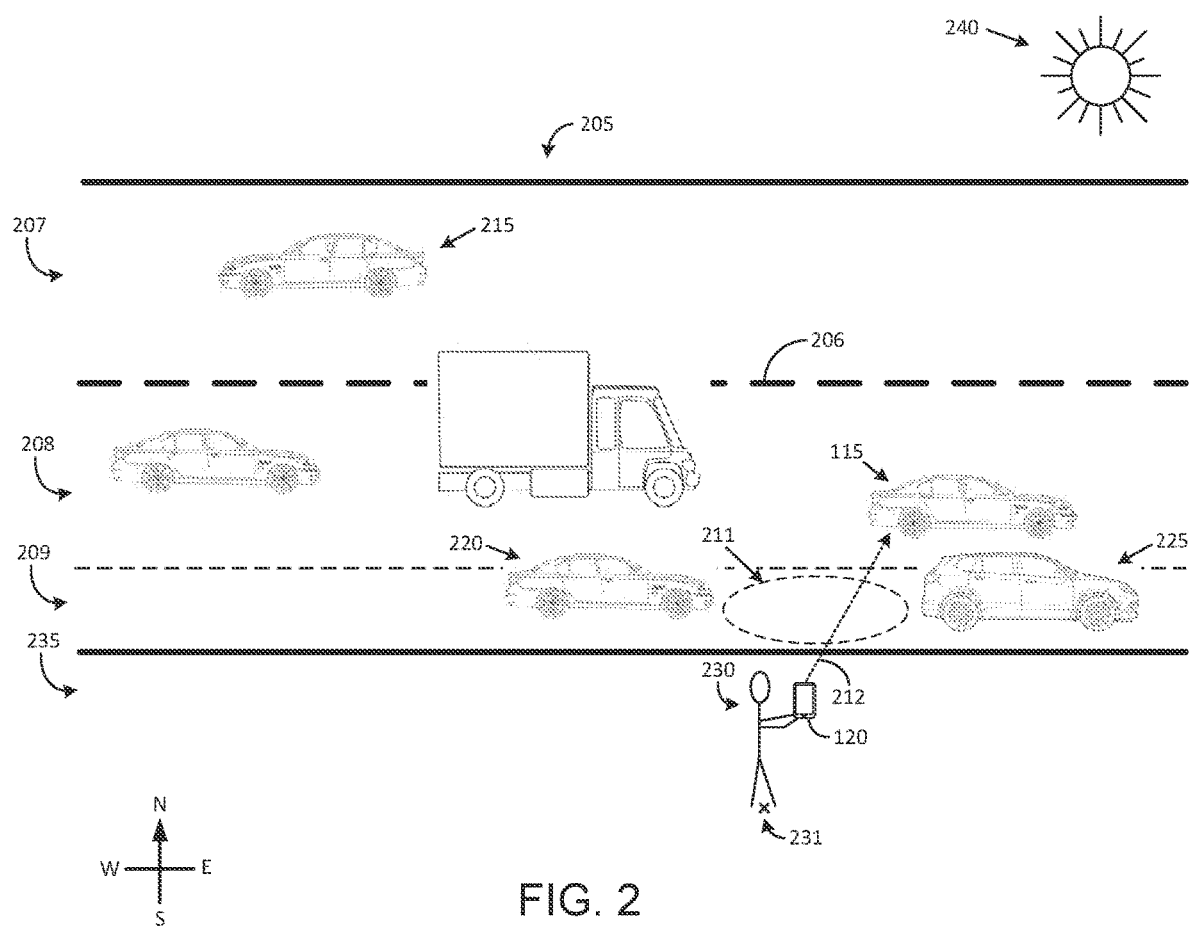
FIG. 2 illustrates a first scenario where a handheld device is used by an individual to execute a remotely-controlled automated vehicle parking operation in accordance with an example embodiment of the disclosure.

FIG. 2 illustrates an example scenario where the remotely-controlled automated vehicle parking system 100 may be used to execute an autonomous parking maneuver by the vehicle 115 in accordance with the disclosure. The vehicle 115 may be a L2 vehicle or any other type of vehicle that can execute an autonomous parking maneuver. In this example scenario, the driver 230 has exited the vehicle 115 and is standing on a curb 235 or a shoulder beside a highway 205. The highway 205 is a divided highway with a median 206 demarcating a lane 207 in which vehicles travel westwards (such as a vehicle 215) and a lane 208 in which vehicles travel eastwards. A parking lane 209 is provided beside the lane 208 for parking vehicles facing eastwards. In the exemplary scenario, the driver 230 has exited the vehicle 115 after noticing an unoccupied parking spot 211 between a vehicle 225 and a vehicle 220 that are parked in the parking lane 209. The driver 230 may then stand at a spot 231 on the curb 235 and launch an automated vehicle parking application installed in the handheld device 120. The automated vehicle parking application may provide to the driver 230, an instruction such as: "Point the camera towards the vehicle you wish to park."

At this time of day, the sun 240 is located low on the horizon, and along a line-of-sight 212 between the camera and the vehicle 115. In this position, the sun causes a large amount of backlighting, thereby leading to capture of a blurry image of the vehicle 115 by the camera. At another time, other adverse image capture conditions may exist such as when the sun 240 has set, the sun 240 is behind dense clouds, there is a large amount of smog in the air, and/or it is raining.

Figure 3:
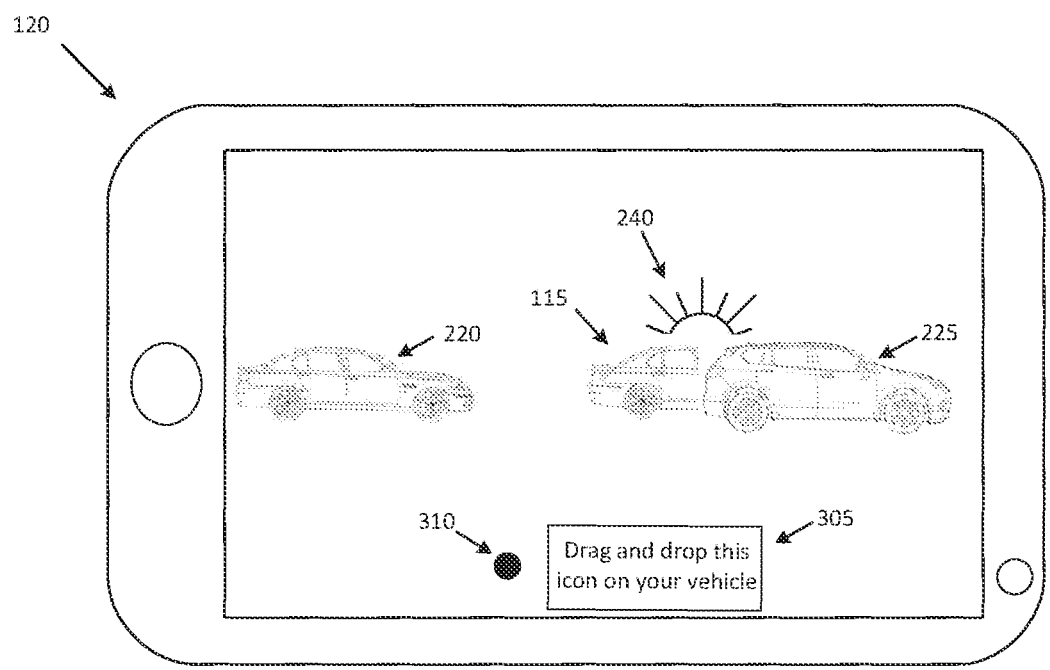
FIG. 3 illustrates an example image displayed upon a display screen of a handheld device during a remotely-controlled automated vehicle parking operation in accordance with an example embodiment of the disclosure.

FIG. 3 illustrates an example image displayed upon a display screen of the smartphone when the driver 230 points the camera of the smartphone towards the vehicle 115 and the sun 240 is low on the horizon. The image can be real-time image frames from the image sensor resulting in a live video display on the display screen. The live video can be used by the driver 230 to monitor the vehicle 115 when the vehicle 115 is executing an autonomous parking maneuver. The automated vehicle parking application provided in the smartphone may first initiate a vehicle identification procedure for allowing the driver 230 to identify the vehicle 115 that is to be parked. Once identified, various other actions can be carried out such as, for example, establishing a visual lock between the camera and the vehicle 115 and estimating a separation distance between the camera and the vehicle 115.

In the example scenario that is illustrated in FIG. 3, the image displayed upon the handheld device 120 may include an icon 310 accompanied by an instruction 305 such as, for example: "Drag and drop this icon upon your vehicle." In a typical operation, the driver 230 may respond to the instruction 305 by dragging and dropping the icon 310 upon the vehicle 115. The automated vehicle parking application may confirm a success of the operation in one of various ways such as by providing a message, or by modifying an appearance of the vehicle 115 (changing a color of the vehicle 115 to green, for example).

However, in this example case, the driver 230 may be unable to fulfil the identification operation because the image generated by the camera of the handheld device 120 is blurry due to backlighting by the sun 240. In another example case, the driver 230 may be unable to fulfil the identification operation because the image generated by the camera is blurry or grainy as a result of insufficient ambient light. Insufficient ambient light may be prevalent for example, when the sun 240 has set and no street lamps are located in the vicinity of the vehicle 115. In yet another example case, the driver 230 may be unable to fulfil the identification operation because the image generated by the camera is blurry or overexposed as a result of the camera facing headlights of oncoming vehicles, or being located below lights in the vicinity of the camera (for example, when the driver 230 is standing under a neon streetlight and the vehicle 115 is located on a dark street).

The quality of images generated by the camera of the handheld device 120 may be poor for various other reasons as well, such as, for example, environmental conditions (rain, smog, fog, haze, smoke, high temperature, low temperature, etc.) during image capture. Environmental conditions may further affect image quality as a result of having adverse effects upon components of the camera (lens, image sensors, processing circuitry, etc.).

Figure 4:
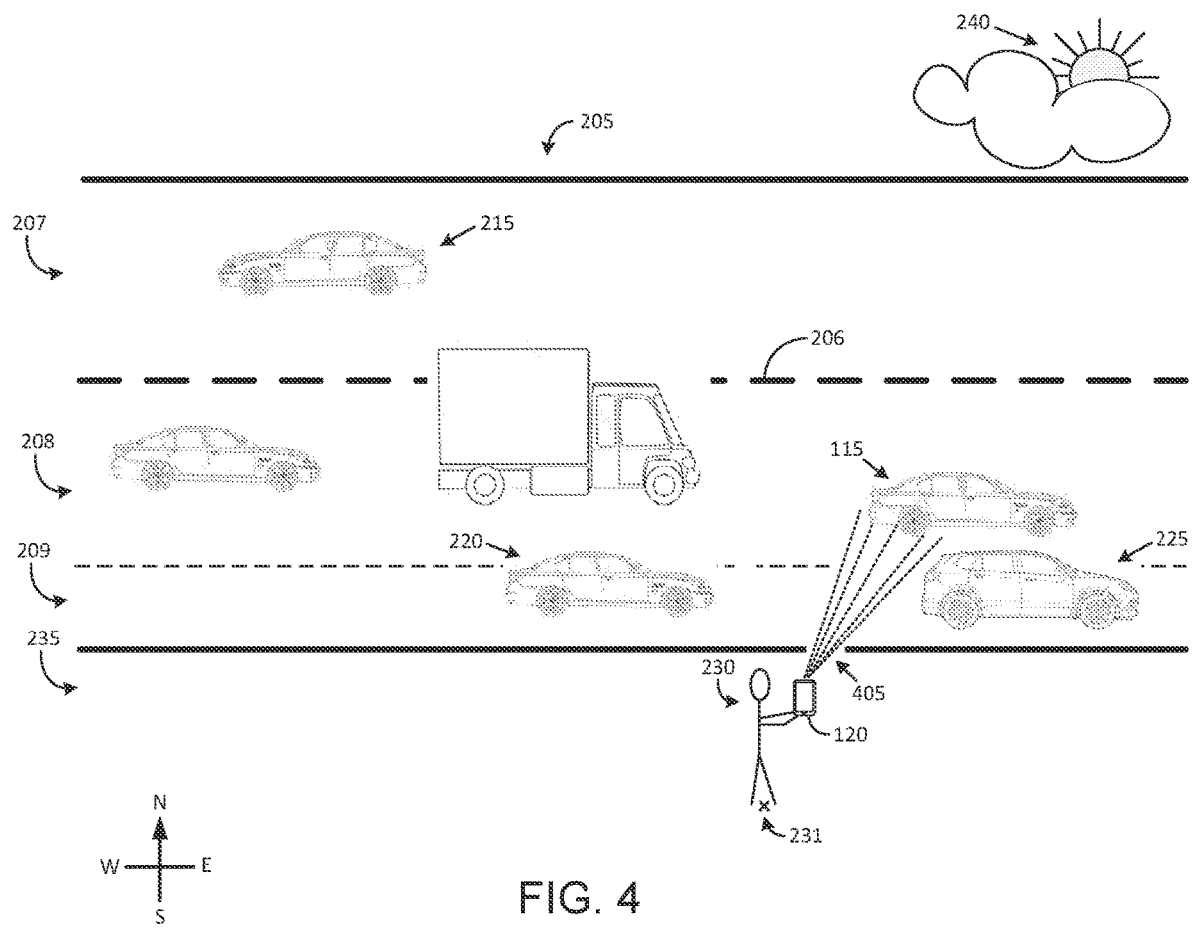
FIG. 4 illustrates a scenario where a handheld device is used in accordance with a first embodiment of the disclosure for executing a remotely-controlled automated vehicle parking operation.

FIG. 4 illustrates a scenario where the handheld device 120 is used in accordance with a first embodiment of the disclosure for executing a remotely-controlled automated vehicle parking operation. In this scenario, the sun 240 is obscured by clouds and the amount of ambient light present in the vicinity of the vehicle 115 is low. Consequently, images captured by the camera in the handheld device 120 may lack enough details for purposes of carrying out operations such as vehicle identification (for confirming the identity of the vehicle 115) and visual lock (for tracking the movement of the vehicle 115 after identification).

An automated vehicle parking application that is provided in the handheld device 120 receives a low-light signal from a light sensor in the handheld device 120 and responds by executing a first set of operations in accordance with an embodiment of the disclosure. The first set of operations can include confirming that the amount of ambient light is below a preset threshold, a confidence level in a visual lock is below a preset threshold, and/or a confidence level in a tracking mode is below a preset threshold and carrying out a second set of operations for improving captured image quality based on the confirmation.

The automated vehicle parking application may also detect a relative position of the handheld device 120 with respect to the sun 240 (or another light source) and display a message to the driver 230 to carry out actions such as, for example, shift his/her position, change a camera angle, and/or shield the camera with a hand or an object.

If such actions do not improve captured image quality, the automated vehicle parking application may carry out additional operations such as, for example, verifying that a state of charge of a battery in the handheld device 120 is above a preset threshold. The preset threshold for the state of the charge may be based on several factors such as ensuring that certain functions of the handheld device 120 (talking, texting, accessing the Internet, etc.) are not adversely affected by the use of a lighting system of the handheld device 120 (a flash system of the camera, for example).

If the state of charge of the battery in the handheld device 120 is above the preset threshold and various other conditions are met, such as, for example, the amount of ambient light is below a preset threshold, a confidence level in a visual lock is below a preset threshold, and/or a confidence level in a tracking mode is below a preset threshold, the automated vehicle parking application activates the lighting system of the handheld device 120.

An intensity of the illumination 405 provided by the lighting system may be determined on the basis of various factors such as, for example, a separation distance between the handheld device 120 and the vehicle 115, and the amount of ambient light present near the vehicle 115. The intensity of the illumination 405 may be set to be directly proportional to the separation distance (higher intensity for greater separation distance and vice-versa) and inversely proportional to the amount of ambient light (lower intensity for higher ambient light and vice-versa). In some cases, if the separation distance is too large, or other factors prevent obtaining satisfactory images, the vehicle parking application may conserve battery charge by preventing use of the lighting system. In this situation, a message may be displayed on the handheld device 120 to indicate that remote control and/or monitoring of the vehicle 115 has been compromised or is infeasible.

If the lighting system is activated, a portion of the illumination 405 that falls upon the vehicle 115 is reflected by the vehicle 115 back towards the camera, thereby increasing the amount of light emanating from the vehicle 115 towards the camera and offering higher image quality. The intensity of the reflected light may be dependent on various factors such as, for example, an angle of incidence of the illumination 405 upon the vehicle 115, a reflectivity factor of the chassis and/or other components of the vehicle 115, and light modification characteristics of the space between the camera and the vehicle (light dispersion, light absorption, particulate density, etc.).

Obtaining a higher quality image by the use of reflected light allows for performing of various operations associated with automated vehicle parking, such as, for example, establishing a visual lock between the handheld device 120 and the vehicle 115. The visual lock permits tracking of the movement of the vehicle 115 upon the display screen of the handheld device 120.

Figure 5:
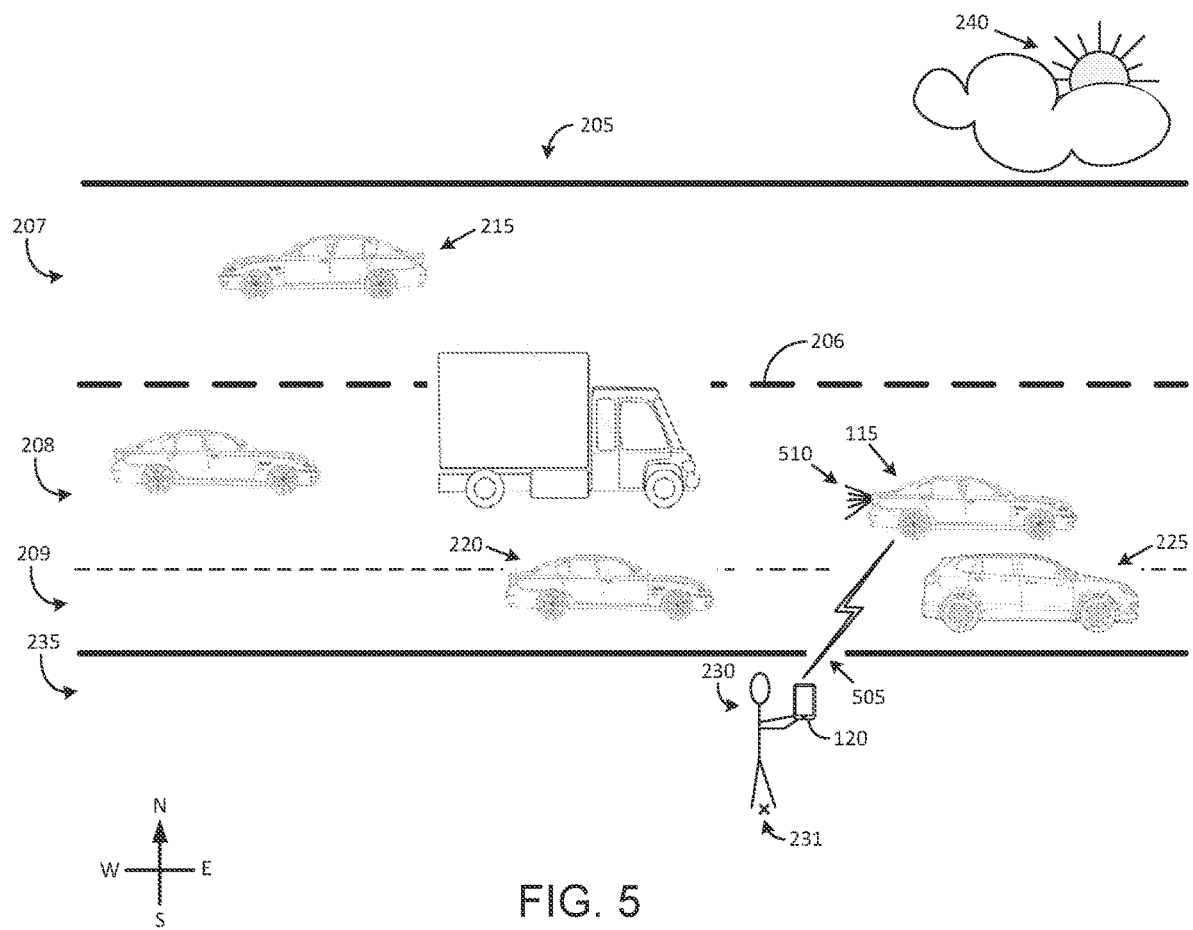
FIG. 5 illustrates a scenario where a handheld device is used in accordance with a second embodiment of the disclosure for executing a remotely-controlled automated vehicle parking operation.

FIG. 5 illustrates a scenario where a handheld device is used in accordance with a second embodiment of the disclosure for executing a remotely-controlled automated vehicle parking operation. This scenario is similar to the one described above where the sun 240 is obscured by clouds and the amount of ambient light present in the vicinity of the vehicle 115 is low. The amount of ambient light present in the vicinity of the vehicle 115 may also be low for various other reasons such as when the parking operation is being conducted after the sun 240 has set.

In this scenario, the driver 230 may launch the automated vehicle parking application that is provided in the handheld device 120 and obtain an image of the vehicle 115 on the display screen of the handheld device 120. The image quality may be poor. Consequently, the driver 230 may click on an icon to activate the transmission of a wireless signal 505 from the handheld device 120 to the vehicle computer 105 and/or to the auxiliary operations computer 110. The wireless signal 505 can be a command signal that instructs the vehicle computer 105 and/or the auxiliary operations computer 110 to turn on one or more lights of the vehicle 115. In some implementations, the wireless signal 505 may instruct the vehicle computer 105 and/or the auxiliary operations computer 110 to turn on a specific light in the vehicle, such as, for example, a tail light 510 of the vehicle 115.

The increase in the amount of light emanating from the vehicle 115 as a result of turning on one or more lights in the vehicle 115 may be adequate for performing operations such as vehicle identification and visual lock. However, in some situations, the increase in the amount of light emanating from the vehicle 115 may be inadequate for the camera to establish a visual lock. If so, the lighting system of the camera may be activated in order to provide the illumination 405 illustrated in FIG. 4. The amount of reflected light obtained from the use of the illumination 405 can supplement the amount of light emitted by the tail light 510 (and/or other lights in the vehicle 115).

In another embodiment, the driver 230 may click on an icon to activate the transmission of a wireless signal 505 from the handheld device 120 to the auxiliary operations computer 110 in the vehicle 115, which in turn, will respond by transmitting a vehicle-to-infrastructure (V2I) signal and/or a vehicle-to-vehicle (V2V) signal. The V2I signal may be transmitted to a street lamp, for example, to turn on the street lamp. The V2V signal may be transmitted to a parked neighboring vehicle to direct the neighboring vehicle to turn on one or more lights. In some implementations, the V2V signal may instruct the neighboring vehicle to turn on a specific light, such as a headlamp, for example. The increase in the amount of light emanating from the street lamp and/or the neighboring vehicle may be adequate for performing operations such as vehicle identification and visual lock.

In some situations, an illumination level on the vehicle 115 may be undesirably high such as, for example, due to a headlight of the vehicle 115 and/or other lights of the vehicle 115 being in an on condition. The automated vehicle parking application may execute certain actions to modify the illumination level. In this situation, the wireless signal 505 can be a command signal that instructs the vehicle computer 105 and/or the auxiliary operations computer 110 to turn off the headlight and one or more of the other lights of the vehicle 115.

Figure 6:
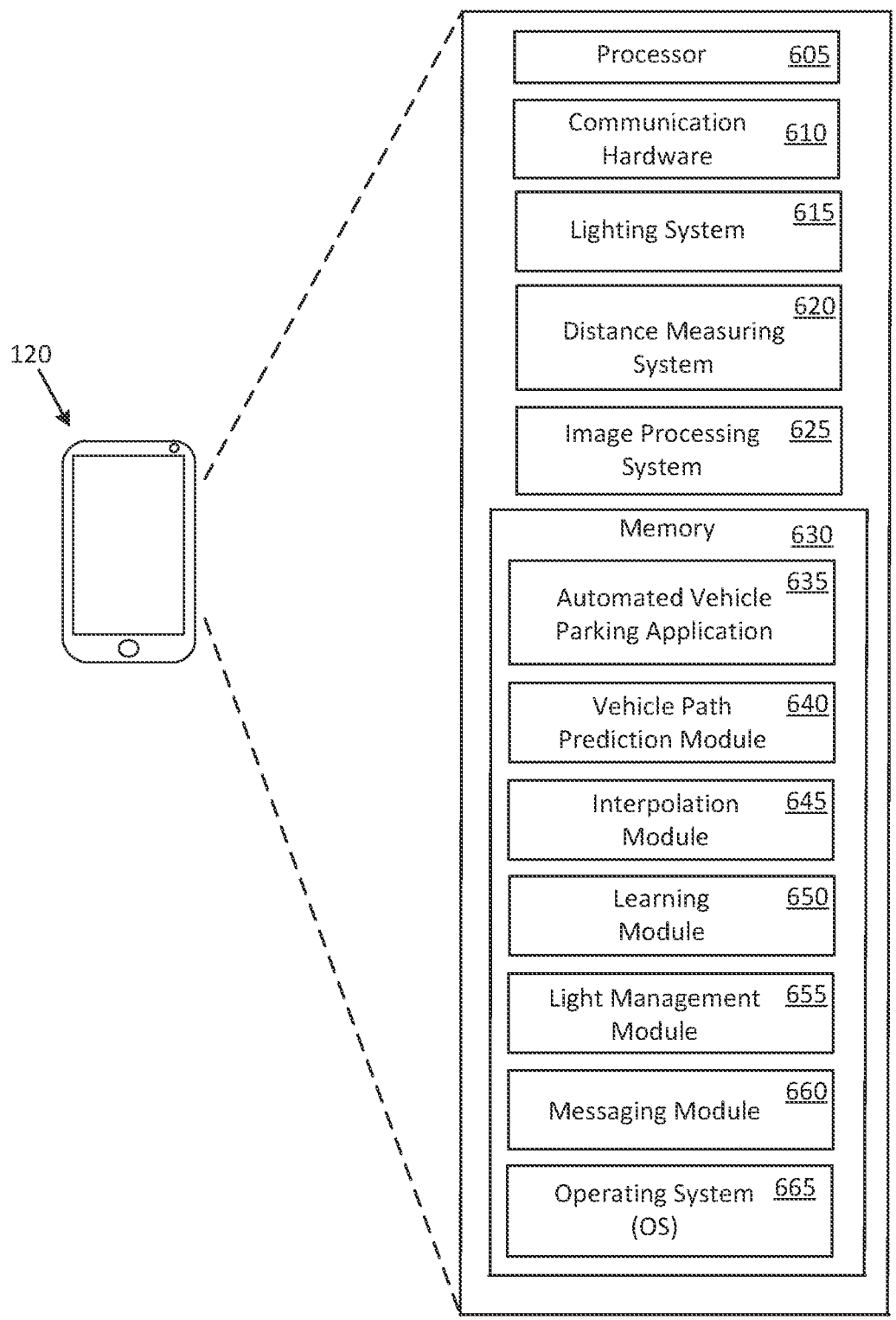
FIG. 6 shows some example components that can be included in a handheld device used for executing a remotely-controlled automated vehicle parking operation in accordance with the disclosure.

FIG. 6 shows some example components that may be included in the handheld device 120 of the remotely-controlled automated vehicle parking system 100 in accordance with the disclosure. In this example configuration, the handheld device 120 can include a processor 605, communication hardware 610, lighting system 615, distance measuring system 620, image processing system 625, and a memory 630.

The communication hardware 610 can include one or more wireless transceivers, such as, for example, a Bluetooth® Low Energy Module (BLEM), that allows the handheld device 120 to transmit and/or receive various types of signals to/from a vehicle such as the vehicle 115. The communication hardware 610 can also include hardware for communicatively coupling the handheld device 120 to the communications network 150 for carrying out communications and data transfers with the server computer 140. In an example embodiment in accordance with the disclosure, the communication hardware 610 includes various security measures to ensure that messages transmitted between the handheld device 120 and the vehicle 115 are not intercepted for malignant purposes. For example, the communication hardware 610 may be configured to provide features such as encryption and decryption of messages and apply radio-frequency (RF) safeguards for RF signal transmissions.

The lighting system 615 may include hardware that is a part of, or is independent of, a flash system of the handheld device 120. The flash system is typically employed for momentarily illuminating objects located in front of a camera of the handheld device 120 when the camera is operated for capturing still images or video clips. The lighting system 615 may be configured to operate in a different manner when used in accordance with the disclosure for illuminating the vehicle 115. For example, the lighting system 615 may be configured to provide light that is more directional in nature so as to primarily illuminate the vehicle 115 rather than other objects nearby (such as, for example, the vehicle 220 and the vehicle 225). In one example implementation, the angular characteristics of light produced by the lighting system 615 may be controllable by the driver 230. For example, the driver 230 may opt to direct a narrow beam of light towards the vehicle 115 in one situation and a broader beam in a different situation. As another example, the intensity of light produced by the lighting system 615 may be configured to be controllable by the driver 230. Thus, for example, the driver 230 may opt to reduce the light intensity in accordance with his/her personal preference and/or based on ambient conditions.

The distance measuring system 620 may include hardware such as one or more application specific integrated circuits (ASICs) containing circuitry that allows the handheld device 120 to execute distance measurement activities. The measurement activities can include measuring a separation distance between the handheld device 120 and the vehicle 115.

The image processing system 625 may include hardware such as one or more ASICs containing circuitry that allows the handheld device 120 to display images (such as the ones described above with respect to FIG. 3). The image processing system 625 may also be used for other actions described herein, such as, for example, carrying out a vehicle identification procedure and obtaining a visual lock between the handheld device 120 and the vehicle 115.

The memory 630, which is one example of a non-transitory computer-readable medium, may be used to store an operating system (OS) 665 and various code modules such as an automated vehicle parking application 635, a vehicle path prediction module 640, an interpolation module 645, a learning module 650, a light management module 655, and a messaging module 660. The code modules are provided in the form of computer-executable instructions that can be executed by the processor 605 for performing various operations in accordance with the disclosure.

The automated vehicle parking application 635 may be executed by the processor 605 for performing various operations related to autonomous vehicle parking. For example, the automated vehicle parking application 635 may cooperate with the communication hardware 610, the lighting system 615, the distance measuring system 620, the image processing system 625, as well as the various other code modules in the memory 630, to allow the driver 230 to remotely control and/or monitor the vehicle 115 when the vehicle 115 is executing an automated parking operation.

For example, the automated vehicle parking application 635 may cooperate with the communication hardware 610 for transmitting the wireless signal 505 from the handheld device 120 to the vehicle computer 105 and/or the auxiliary operations computer 110 as illustrated in FIG. 5 and described above. The wireless signal 505 can be a command signal that instructs the vehicle computer 105 and/or the auxiliary operations computer 110 to turn on one or more lights of the vehicle 115.

The automated vehicle parking application 635 may cooperate with the lighting system 615 for providing the illumination 405 that is illustrated in FIG. 4 and described above. In an example implementation, the processor 605 receives a low-light signal from a light sensor (not shown) provided in the handheld device 120 and responds by activating the lighting system 615. The low-light signal may be further utilized by the processor 605 to set an intensity level of the illumination 405 provided by the lighting system 615.

The automated vehicle parking application 635 may cooperate with the distance measuring system 620 for operations such as measuring a separation distance between the handheld device 120 and the vehicle 115 and proportionally setting an intensity of the illumination 405 in accordance with the separation distance.

The automated vehicle parking application 635 may cooperate with the image processing system 625 to process images (such as the one illustrated in FIG. 3) captured by the camera in the handheld device 120. The automated vehicle parking application 635 may then cooperate with the messaging module 660 to display messages to the driver 230 for carrying out actions such as, for example, shifting his/her position, changing a camera angle, and/or shielding the camera with a hand or an object if the captured images have unsatisfactory image quality.

The automated vehicle parking application 635 may cooperate with the vehicle path prediction module 640 for predicting a path that may be followed by the vehicle 115 when executing an automated parking operation. More particularly, the vehicle path prediction module 640 may operate to predict a location of the vehicle 115 in each of a set of sequential images displayed upon the display screen of the handheld device 120 when the vehicle 115 is executing the automated parking operation. The path prediction operation may be based on various parameters such as, for example, a separation distance between the handheld device 120 and the vehicle 115 at various times and an observed movement pattern of the vehicle 115 and/or the driver 230 at various times. Such parameters may be obtained by the use of various elements in the vehicle 115 and/or in the handheld device 120. Some example elements can include a GPS system and one or more sensors. Predicting a path of the vehicle 115 can help in reducing computation time by the processor 605 and improve an efficiency of a tracking algorithm that may be a part of the automated vehicle parking application 635. The efficiency of the tracking algorithm is typically improved as a result of a reduction in an image field of view that helps the tracking algorithm maintain focus upon the vehicle 115.

The automated vehicle parking application 635 may cooperate with the interpolation module 645 for improving an operational efficiency when attempting to achieve a visual lock between the handheld device 120 and the vehicle 115 and/or during tracking of the vehicle 115 after achieving a visual lock. The interpolation module 645 may be executed in order to performing interpolation between various tracking parameters in a retroactive mode of operation. Tracking parameters may include, for example, threshold values for edge detection in an image and a 3-dimensional (3D) model for matching vehicle tolerance. A one-time setup procedure may be used for optimal visual tracking of the vehicle 115 in a 3D format. The tracking parameters may be tuned to a tracking state, which encompasses various items such as, for example, overall ambient light, artificial lighting (from a street lamp, for example), illumination 405 provided by the handheld device 120, lighting provided by the vehicle 115 (tail light 510 shown in FIG. 5), initial orientation of the vehicle 115, environmental conditions, and camera capabilities (calibration, motion detection, etc.).

The use of multiple tracking states provides better results than a single multiple tracking state because in some cases, the use of a single tracking state may produce inconsistent tracking performance. In one method in accordance with the disclosure, multiple tracking configurations may be tuned to a set of popular tracking states, followed by execution of an algorithm in real time. The algorithm interpolates between the multiple tracking configurations until an optimal fit is achieved.

The automated vehicle parking application 635 may cooperate with the learning module 650 for using machine learning models to predict and choose optimal configuration settings for a selected tracking state. A machine learning model may be continuously trained using a reinforcement learning technique with a cost/reward structure. The cost/reward structure may penalize a model that produces poor tracking quality and may be rewarded by being reinforced when a tracking configuration is selected with a minimum number of attempts.

The automated vehicle parking application 635 may cooperate with the light management module 655 for producing images with good signal to noise ratio when executing vehicle detection and seamless tracking of the vehicle 115. Use of the light management module 655 can include enhancement techniques such as wavelet transform, use of a Retinex model on images during low light conditions, fusion of multiple images with various exposure times and aperture settings. The enhancement techniques can be combined with machine learning techniques for improving signal to noise ratios in images.

Figure 7:
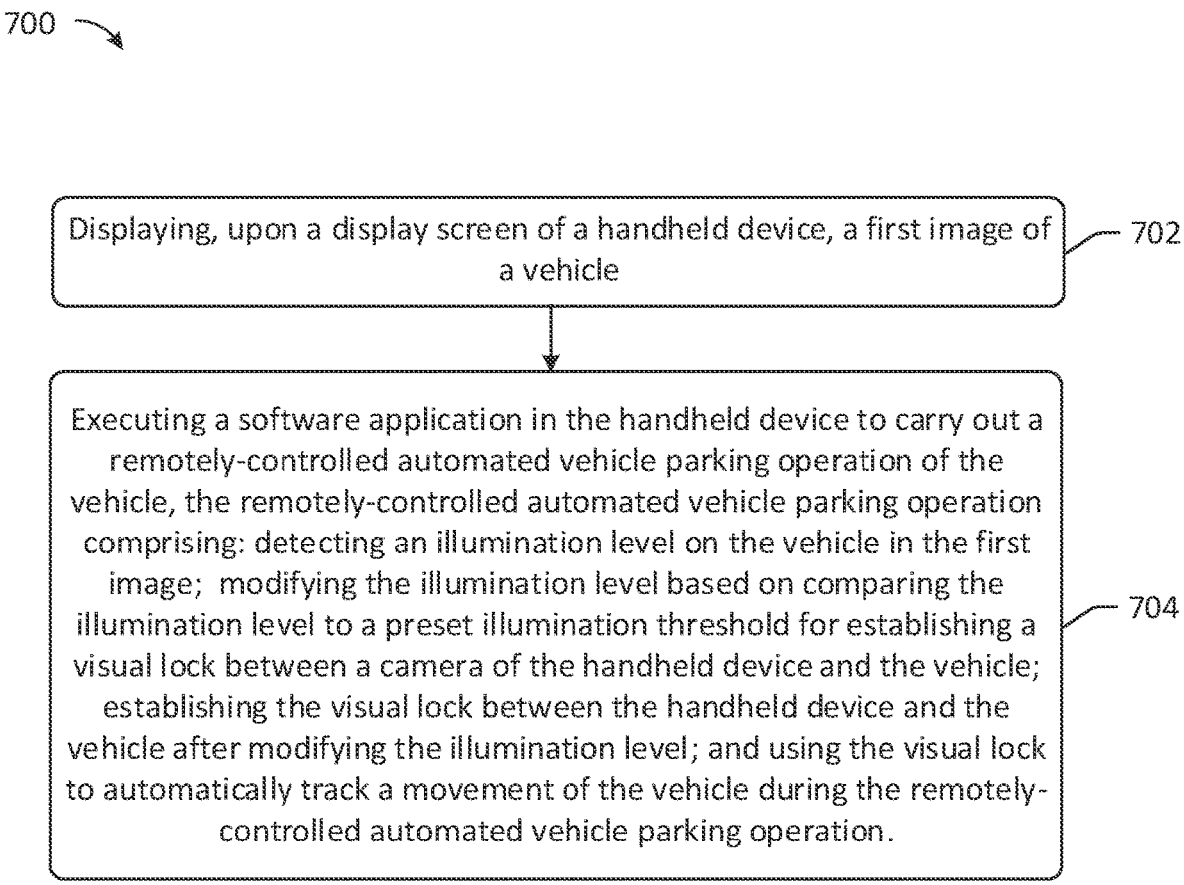
FIG. 7 illustrates an example method in accordance with the disclosure.

FIG. 7 illustrates an example method 700. At block 702, the method 700 may include determining that a camera of a handheld device is pointed towards a vehicle. At block 704, the method 700 may include displaying, upon a display screen of the handheld device, a first image of the vehicle. At block 706, the method 700 may include executing a software application in the handheld device to carry out a remotely-controlled automated vehicle parking operation of the vehicle, the software application comprising a path prediction procedure that predicts a direction of movement of the vehicle during the remotely-controlled automated vehicle parking operation.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 630, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   displaying, upon a display screen of a handheld device, a first image of a vehicle; and
   executing a software application in the handheld device to carry out a remotely-controlled automated vehicle parking operation of the vehicle, the remotely-controlled automated vehicle parking operation comprising:
   detecting an illumination level on the vehicle in the first image;
   comparing the illumination level to a preset illumination threshold for establishing a visual lock between a camera of the handheld device and the vehicle;
   determining that the illumination level is below the preset illumination threshold;
   modifying the illumination level by increasing an illumination provided by the handheld device;
   establishing the visual lock between the handheld device and the vehicle after modifying the illumination level; and
   using the visual lock to automatically track a movement of the vehicle during the remotely-controlled automated vehicle parking operation.

2. The method of claim 1, wherein modifying the illumination level comprises one of increasing an amount of light emanating from the vehicle towards the camera or decreasing the amount of light emanating from the vehicle towards the camera.

3. The method of claim 2, wherein increasing the amount of light emanating from the vehicle towards the camera comprises one of illuminating the vehicle by transmitting light from the handheld device towards the vehicle or transmitting a command from the handheld device to a light controller in the vehicle to direct the light controller to turn on a light in the vehicle.

4. The method of claim 3, wherein illuminating the vehicle by transmitting light from the handheld device towards the vehicle comprises:
   determining a state of charge of a battery in the handheld device; and
   transmitting light from the handheld device towards the vehicle subject to the state of charge being above a threshold level.

5. The method of claim 2, wherein decreasing the amount of light emanating from the vehicle towards the camera comprises transmitting a command from the handheld device to a light controller in the vehicle to direct the light controller to turn off a light in the vehicle.

6. The method of claim 2, wherein the software application includes an interpolation procedure that predicts a direction of movement of the vehicle based on processing a set of images after the visual lock is established between the handheld device and the vehicle.

7. The method of claim 6, wherein the interpolation procedure comprises generating a tracking diagram that includes a computer aided design (CAD) image of the vehicle.

8. A method comprising:
   displaying, upon a display screen of a handheld device, a first image of a vehicle; and
   executing a software application in the handheld device to carry out a remotely-controlled automated vehicle parking operation of the vehicle, the software application comprising a path prediction procedure that predicts a direction of movement of the vehicle during the remotely-controlled automated vehicle parking operation;

detecting an illumination level of the vehicle in the first image;

modifying the illumination level based on comparing the illumination level to a preset illumination threshold for establishing a visual lock between a camera of the handheld device and the vehicle, wherein modifying the illumination level comprises decreasing an amount of light emanating from the vehicle towards the camera, wherein decreasing the amount of light emanating from the vehicle towards the camera comprises transmitting a command from the handheld device to a light controller in the vehicle to direct the light controller to turn off a light in the vehicle;

establishing the visual lock between the handheld device and the vehicle after modifying the illumination level; and using the visual lock to automatically track a movement of the vehicle during the remotely-controlled automated vehicle parking operation.

9. The method of claim 8, wherein increasing the amount of light emanating from the vehicle towards the camera comprises one of illuminating the vehicle by transmitting light from the handheld device towards the vehicle or transmitting a command from the handheld device to a light controller in the vehicle to direct the light controller to turn on a light in the vehicle.

10. The method of claim 9, wherein illuminating the vehicle by transmitting light from the handheld device towards the vehicle comprises:
   determining a state of charge of a battery in the handheld device; and
   transmitting light from the handheld device towards the vehicle subject to the state of charge being above a threshold level.

11. The method of claim 8, wherein the software application includes an interpolation procedure that predicts a direction of movement of the vehicle based on processing a set of images after the visual lock is established between the handheld device and the vehicle.

12. A handheld device comprising:
   a display screen;
   a camera;
   a memory that stores computer-executable instructions; and
   a processor configured to access the memory and execute the computer-executable instructions to at least:
   displaying, upon a display screen, a first image of a vehicle; and
   execute a remotely-controlled automated vehicle parking operation of the vehicle, the remotely-controlled automated vehicle parking operation comprising:
   detecting an illumination level on the vehicle in the first image;
   comparing the illumination level to a preset illumination threshold for establishing a visual lock between a camera of the handheld device and the vehicle;
   determining that the illumination level is below the preset illumination threshold;
   modifying the illumination level by increasing an illumination provided by the handheld device;
   establishing the visual lock between the handheld device and the vehicle after modifying the illumination level; and
   using the visual lock to automatically track a movement of the vehicle during the remotely-controlled automated vehicle parking operation.

13. The handheld device of claim 12, wherein modifying the illumination level comprises one of increasing an amount of light emanating from the vehicle towards the camera or decreasing the amount of light emanating from the vehicle towards the camera.

14. The handheld device of claim 13, wherein increasing the amount of light emanating from the vehicle towards the camera comprises one of illuminating the vehicle by transmitting light from the handheld device towards the vehicle or transmitting a command from the handheld device to a light controller in the vehicle to direct the light controller to turn on a light in the vehicle.

15. The handheld device of claim 14, wherein illuminating the vehicle by transmitting light from the handheld device towards the vehicle comprises:
   determining a state of charge of a battery in the handheld device; and
   transmitting light from the handheld device towards the vehicle subject to the state of charge being above a threshold level.

16. The handheld device of claim 12, wherein the processor is configured to access the memory and execute additional computer-executable instructions to:
   execute an interpolation procedure that predicts a direction of movement of the vehicle based on processing a set of images of the vehicle.

17. The handheld device of claim 16, wherein the interpolation procedure comprises generating a tracking diagram that includes a computer aided design (CAD) image of the vehicle.

* * * * *